(12) United States Patent
Lindström et al.

(10) Patent No.: US 8,641,789 B2
(45) Date of Patent: Feb. 4, 2014

(54) REFORMER REACTOR AND METHOD FOR CONVERTING HYDROCARBON FUELS INTO HYDROGEN RICH GAS

(75) Inventors: Bård Lindström, Stockholm (SE); Lars Pettersson, Skarpnäck (SE); Staffan Lundgren, Hindås (SE)

(73) Assignee: Powercell Sweden AB, Gothenburg (SE)

( * ) Notice: Subject to any disclaimer, the term of this patent is extended or adjusted under 35 U.S.C. 154(b) by 832 days.

(21) Appl. No.: 12/668,895

(22) PCT Filed: Jul. 13, 2007

(86) PCT No.: PCT/SE2007/000687
§ 371 (c)(1),
(2), (4) Date: Aug. 26, 2010

(87) PCT Pub. No.: WO2009/011622
PCT Pub. Date: Jan. 22, 2009

(65) Prior Publication Data
US 2010/0314584 A1 Dec. 16, 2010

(51) Int. Cl.
*B01J 7/00* (2006.01)
*B01J 8/00* (2006.01)

(52) U.S. Cl.
USPC .............................. 48/61; 48/197 R; 422/625

(58) Field of Classification Search
USPC ............................................ 48/61; 422/625
See application file for complete search history.

(56) References Cited

U.S. PATENT DOCUMENTS

| 6,770,106 | B1 | 8/2004 | Okamoto et al. |
| 2002/0110507 | A1 | 8/2002 | Grieve et al. |
| 2003/0072700 | A1 | 4/2003 | Goebel et al. |
| 2005/0072048 | A1* | 4/2005 | Lesieur ........................ 48/127.9 |
| 2005/0086865 | A1 | 4/2005 | Crane et al. |

FOREIGN PATENT DOCUMENTS

| EP | 1213052 A1 | 6/2002 |
| WO | 2005070818 A1 | 8/2005 |

OTHER PUBLICATIONS

Supplementary European Search Report for corresponding European Applicatino EP 07 76 8999, Oct. 13, 2011.
International Search Report for corresponding International Application PCT/SE2007/000687.

* cited by examiner

*Primary Examiner* — Matthew Merkling
(74) *Attorney, Agent, or Firm* — WRB-IP LLP

(57) ABSTRACT

A reformer reactor is provided for converting hydrocarbon fuel into hydrogen rich gas by auto-thermal reaction process. The reformer reactor has a preferably cylindrically shaped, double wall housing with an inner wall and an outer wall and two side faces, wherein the inner wall and the two side faces form a reaction chamber. Additionally, the inner wall is charged with a first electric charge which prevents the hydrocarbon fuel molecules injected into the reaction chamber by a fuel inlet from hitting the warm inside surfaces of the reaction chamber and burn to soot, subsequently.

18 Claims, 1 Drawing Sheet

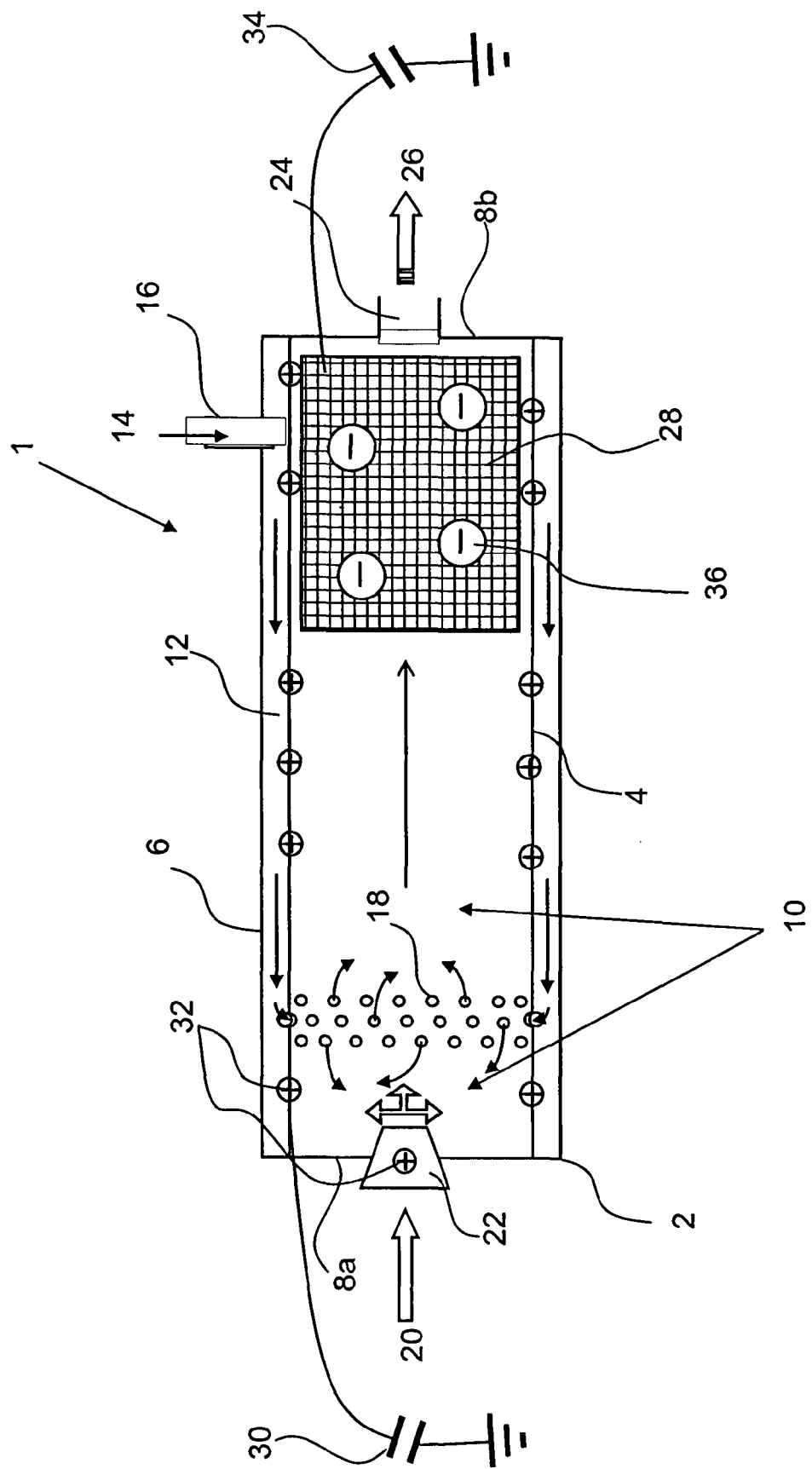

REFORMER REACTOR AND METHOD FOR CONVERTING HYDROCARBON FUELS INTO HYDROGEN RICH GAS

BACKGROUND AND SUMMARY

The present invention relates to a reformer reactor for converting hydrocarbon fuels into hydrogen rich gas for fuel cells and/or exhaust treatment applications by auto-thermal reaction and a method for converting hydrocarbon fuels into hydrogen rich gas using the reformer reactor.

In the state of the art it is well known to produce hydrogen rich gas for the use in fuels cells of transportation devices by reforming hydrocarbon fuels, like gasoline or diesel fuels. Conventionally, hydrogen is produced in large-scale industrial facilities and then stored on board of the transportation devices. The recent development of small-scale on-board hydrogen sources, so-called reformer reactors, provides a possibility for producing hydrogen on demand without the necessity of hydrogen storage.

In general there are three known methods of reforming gaseous or liquid hydrocarbon fuels into hydrogen: catalytic steam reforming, partial oxidation reforming and auto-thermal reforming.

In catalytic steam reforming processes a mixture of steam and hydrocarbon fuel is exposed to a suitable catalyst, like nickel, at a high temperature (between 7000 C and 1000° C.). The reaction is highly endothermic and requires an external source of heat and a source of steam.

In partial oxidation reforming processes a mixture hydrogen fuel and an oxygen containing gas, like ambient air, are brought together within a reaction chamber and subjected to an elevated temperature, preferably in the presence of a catalyst. The catalyst used is normally a noble metal or nickel and the temperature is between 700° C. and 1700° C. The reaction is highly exothermic and once started generates sufficient heat to be self sustaining. In order to promote the oxidation reaction it is necessary to preheat the feed fuel and to reduce temperature variations in the reactor.

U.S. Pat. No. 6,770,106, for example describes a partial oxidizing reformer for reforming feed gas containing hydrocarbon or methane wherein the reduction of temperature variations is achieved by an reactor being covered with a passage for preheated feed gas and therefore being thermally isolated by the feed gas passage. The reaction heat is recovered by a heat exchanger for the purpose of preheating the feed gas.

Auto-thermal reforming processes are a combination of steam reforming and partial oxidation reforming. Waste heat from the partial oxidation reforming reaction is used to heat the endothermic steam reforming reaction.

The natural by-products of all reforming processes are carbon monoxide and carbon dioxides. But, since the hydrocarbon fuels were not designed as a feed stock for generating hydrogen, there are also other by-products such as sulphur, olefins, benzene, methyl amid and higher molecular weight aromatics. These by-products may be harmful to the fuel cells and should therefore be removed by subsequent steps outside the reformer reactor.

Another disadvantage is that hydrocarbon fuels, especially diesel, tend to burn to soot by contact with the inside surfaces of the reactor. Soot particles again, are very harmful to the fuel cells and have to be removed before the reformed hydrogen is applied to the fuel cells.

It is desirable to reduce the risk of fuel molecules burning to soot by coming into contact with the inside surfaces of the reactor.

According to an aspect of the present invention the inner wall and therefore the inside surfaces of a reaction space is charged with a first electric charge. This takes into account that the fuel molecules sprayed into the reaction chamber by a fuel inlet are charged. Charging the inner walls of the reactor housing with a certain electric charge statistically prevents 50% of the fuel molecules to come into contact with the inside surfaces of the reaction chamber because of electrostatic repulsion. This reduces the risk of fuel molecules burning to soot, significantly.

According to another advantageous embodiment also the fuel inlet is charged. Preferably, the fuel inlet is charged with equal electric charge as the inner wall. This results in that all fuel molecules have the same electric charge as the inner wall and are therefore electrically repelled there from. Thus, it is almost impossible that the fuel molecules come into contact with the inner wall and burn to soot.

Another preferred embodiment is provided with a catalyst for the auto-thermal reaction inside the reaction chamber to accelerate the conversion of hydrocarbon fuel into hydrogen rich gas. Preferably, the catalyst can also be charged. This is realised in another embodiment, wherein the electric charge of the catalyst is opposite to the electric charge of the inner wall and/or the fuel inlet. This accelerates the fuel/oxidising agent mixture toward the catalyst and consequently accelerates the conversion reaction. The catalyst can be a ceramic monolith or metal grid.

A further preferred embodiment of the present invention takes advantage of the fact that formation of soot by burning of fuel particles in contact with the inner walls of the reactor occurs only above a certain wall temperature. Remains the wall temperature below, for example by cooling the walls or by keeping the temperature of the reaction space below a certain level, the burning of fuel particles to soot is prevented.

Generally, there is the possibility to provide the reactor with an external cooling device but this increases the dimension of the reactor and adds a further consumer of energy to the system being supplied with energy by the fuel cells.

Therefore, the preferred embodiment uses the relatively cool oxidising agent for cooling the inner wall of the reactor. That means at the same time that a thermal isolation of the inner wall can be left out, whereby the dimension of the reactor is further reduced.

Another advantage of the cooling of the inner wall is that the temperature inside the reaction chamber can be held constant and the temperature of the oxidising agent can be controlled.

As shown in another preferred embodiment of the present invention, the oxidising agent outlet provided in the inner wall of the housing is formed as a plurality of holes. This facilitates the homogenous distribution of oxidising agent in the reaction chamber. Preferably, size, shape and/or location of the holes can vary according to the used oxidising agent, the used hydrocarbon fuel and/or their temperature. Most preferably, the oxidising agent outlet is provided in the vicinity of the fuel inlet.

BRIEF DESCRIPTION OF THE DRAWINGS

In the following a preferred embodiment of the invention will be discussed with help of a drawing. The description is considered as exemplification of the principles of the invention and is not intended to limit the scope of the claims.

FIG. 1 shows a schematic view of a preferred embodiment of the present invention.

DETAILED DESCRIPTION

FIG. 1 shows a reformer reactor according to a preferred embodiment of the invention.

The reformer reactor 1 has a housing 2 with an inner wall 4, an outer wall 6 and side walls 8a, 8b. Inner wall 4 and side walls 8a, 8b define a reaction chamber 10 in which hydrocarbon fuel and oxidising agent are brought together and an auto-thermal reaction can take place.

Inner wall 4 and outer wall 6 define a space 12 between them. The space 12 in turn forms a passage for oxidising agent 14 between an oxidising agent inlet 16 and an oxidising agent outlet 18. Oxidising agent outlet 18 is formed as a plurality of holes, which size, shape and location varies depending on the used oxidising agent 14, a used hydrocarbon fuel 20 and their temperature. The plurality of holes can have uniform size and shape, but it is also possible that the holes vary in size and shape among each other.

Further, reformer reactor 1 has a hydrocarbon fuel inlet 22 which is located in one of the side walls 8a of housing 2. Preferably, fuel inlet 22 is formed as a fuel injector which provides a fuel spray in reaction chamber 10. A reformer gas outlet 24 is provided in the opposite side wall 8b of housing 2. Reformer gas 26 is a hydrogen rich gas which can be used for operating of fuel cells and is the product of the auto-thermal reaction.

Additionally, reformer reactor 1 includes a catalyst 28 for catalysing the auto-thermal reaction in reaction chamber 10. The catalyst 28 accelerates the auto-thermal reaction, but it is also possible to use a reformer reactor according to the present invention without a catalyst. The catalyst 28 is preferably a metal grid or ceramic monolith. But it is possible to use any other suitable substrate for the design of catalyst 28.

As shown in FIG. 1, two electric charge sources 30 and 34 are provided. Electric charge source 30 is connected to the inner wall 4 and the fuel inlet 22, thereby providing the walls of reaction chamber 10 and the molecules of the hydrocarbon fuel 20 with a first electric charge 32. In FIG. 1 the electrically charged walls are schematically designated by exemplary positive charges. Electric charge source 34 is connected with catalyst 28 and provides the catalyst 28 with a second electric charge 36 being opposite to the first electric charge 32. In FIG. 1, the opposite electric charges 36 are designated by exemplary negative charges.

In the following the operation of the reformer reactor is described by means of the exemplary conversion of diesel as hydrocarbon fuel into hydrogen with an air/steam-mixture as oxidising agent. The reaction for the conversion is auto-thermal.

According to the invention air and steam are mixed before the air/steam-mixture 14 is injected by oxidising agent inlet 16 into space 12 which serves as air/steam passage for transportation of the air/steam mixture 14 from oxidising agent inlet 16 to oxidising agent outlet 18 of the reactor.

On the way down to the plurality of outlet holes 18 in the inner wall 4 of housing 2 the air/steam-mixture 14 is used to cool the inner wall 4 of reaction chamber 10. By cooling the inner wall 4 of the reaction chamber 10 the risk that diesel fuel molecules in the reaction chamber 10 of the reactor are burned to soot when hitting the reaction chamber wall, is reduced.

Then, the air/steam-mixture 14 is forced through the holes 18 into the reaction chamber 10 of the reactor forming a homogenous air/steam fume in the reaction chamber 10. After introducing the air/steam-mixture into the reaction chamber 10, diesel fuel 20 is sprayed into the air/steam fume by means of fuel injector 22. Inside reaction chamber 10 a turbulent mixture of the air/steam-fume with the diesel fuel spray happens, wherein the fuel spray 20 is evaporated through contact with the air/steam fume. The vaporisation is explained below.

Since the inner walls 4 of reaction chamber 10 are charged with, for example, positive charge and the diesel fuel molecules of the diesel fuel spray are also charged with positive charges the diesel molecules are repelled from the walls of reaction chamber 10 by electrostatic repulsion. Therefore, the diesel molecules cannot come into contact with the heated walls of reaction chamber 10 and burn to soot, subsequently.

The walls of the reaction chamber 10 are heated by the homogenous oxidation taking place in the reaction chamber 10 when oxygen coming from the air/steam-mixture 14 reacts with "lighter" hydrocarbon molecules of the diesel fuel 20 having shorter chains ($C_xH_y + O_2 \rightarrow CO_2 + CO + H_2O$). The process heat produced by this process is used to vaporize the remaining hydrocarbon molecules (with longer chains) of the diesel fuel spray. After this process there is a homogeneous gas mixture of hydrocarbons and steam in the reaction chamber 10 since the portion of the remaining air is negligible.

This homogeneous gas mixture is then introduced into catalyst 28 where the hydrocarbons of the diesel fuel 20 are undergoing the auto-thermal reaction process. To accelerate the introduction of the homogenous gas mixture into the catalyst 28, the catalyst 28 can also be charged with a second charge which is opposite to the charge of the fuel molecules. In the embodiment shown the fuel molecules are positively charged. Therefore, the catalyst is charged with negative charge so that the molecules are attracted by the catalyst by means of electrostatic attraction. This accelerates the movement of the homogenous gas mixture in direction of the catalyst.

In the auto-thermal reaction process taking place inside the catalyst hydrogen (H), CO and $CO_2$ are produced as dominant process products. These products are processed in subsequent steps outside the reformer with the aim to separate H from all other process products.

Since the formation of soot by burning of diesel molecules is prevented by the application of electric charges and due to electrostatic repulsion, the impurities of the hydrogen rich gas are reduced. This facilitates the separation of pure hydrogen from the other process products.

REFERENCE LIST

1 Reformer reactor
2 housing
4 inner wall
6 outer wall
8a, t>sides faces
10 reaction chamber
12 space=oxidising agent passage
14 oxidising agent
16 oxidising agent inlet
18 oxidising agent outlet
20 hydrocarbon fuel
22 hydrocarbon fuel inlet
24 hydrogen rich gas outlet
26 hydrogen rich gas
28 catalyst
30 first electric charge source
32 first electric charge
34 second electric charge source
36 second electric charge

The invention claimed is:

1. Reformer reactor for converting hydrocarbon fuels into a hydrogen rich gas for fuel cells and/or exhaust treatment applications by auto-thermal reaction comprising a housing with an inner wall and an outer wall forming a space in-between, and two side faces, wherein the inner wall and the two side faces form a reaction chamber of the reformer reactor, and a charge source connected to the inner wall for charging the inner wall with a first electric charge.

2. Reformer reactor according to claim 1, wherein the reformer reactor further comprises a fuel inlet which is provided in one of the two side faces.

3. Reformer reactor according to claim 2, wherein the fuel inlet is connected to the first charge source for being charged with the first electric charge.

4. Reformer reactor according to claim 2, wherein the fuel inlet is formed as a fuel injector.

5. Reformer reactor according to claim 1, wherein further a catalyst for the auto-thermal reaction is provided in the reaction chamber.

6. Reformer reactor according to claim 5, comprising a second charge source connected to the catalyst for charging the catalyst with a second electric charge.

7. Reformer reactor according to claim 5, wherein the catalyst is a ceramic monolith or metal grid.

8. Reformer reactor according to claim 6, wherein the reformer reactor further comprises a fuel inlet which is provided in one of the two faces, the fuel inlet is connected to the first charge source for being charged with the first electric charge, and the first electric charge is the opposite of the second electric charge.

9. Reformer reactor according to claim 1, wherein the space is designed as oxidizing agent passage between an oxidizing agent inlet provided in the outer wall and an oxidizing agent outlet provided in the inner wall.

10. Reformer reactor according to claim 9, wherein the reformer reactor further comprises a fuel inlet which is provided in one of the two faces and the oxidizing agent outlet is located in the vicinity of the fuel inlet.

11. Reformer reactor according to claim 9, wherein the oxidizing agent outlet is designed as a plurality of holes introducing the oxidizing agent into the reactor chamber.

12. Reformer reactor according to claim 11, wherein the plurality of holes has various size and/or shape.

13. Reformer reactor according to claim 11, wherein the plurality of holes is located in a variety of different locations.

14. Reformer reactor according to claim 12, wherein size and/or shape and/or location of the plurality of holes depend on the used hydrocarbon fuel and/or the used oxidizing agent.

15. Reformer reactor according to claim 1, wherein the oxidizing agent is air or steam or a mixture thereof.

16. Reformer reactor according to claim 15, wherein the air/steam mixture is premixed.

17. Reformer reactor according to claim 1, wherein the housing is cylindrically shaped.

18. Method for converting hydrocarbon fuels into a hydrogen rich gas for fuel cells and/or exhaust treatment applications by auto-thermal reaction using a reformer reactor for converting hydrocarbon fuels into a hydrogen rich as for fuel cells and/or exhaust treatment applications by auto-thermal reaction comprising a housing with an inner wall and an outer wall forming a space in-between, and two side faces, wherein the inner wall and the two side faces form a reaction chamber of the reformer reactor, and a charge source connected to the inner wall for charging the inner wall with a first electric charge.

* * * * *